(12) United States Patent
Xiang et al.

(10) Patent No.: US 12,141,370 B2
(45) Date of Patent: Nov. 12, 2024

(54) INFORMATION INPUT METHOD, SYSTEM OF CLOUD INPUT METHOD AND CLIENT

(71) Applicant: Beijing Bytedance Network Technology Co., Ltd., Beijing (CN)

(72) Inventors: Rong Xiang, Beijing (CN); Wangbang Wu, Beijing (CN); Chenteng Wang, Beijing (CN); Kai Li, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/999,110

(22) PCT Filed: Oct. 25, 2021

(86) PCT No.: PCT/CN2021/126207
§ 371 (c)(1),
(2) Date: Nov. 17, 2022

(87) PCT Pub. No.: WO2022/095746
PCT Pub. Date: May 12, 2022

(65) Prior Publication Data
US 2023/0350502 A1 Nov. 2, 2023

(30) Foreign Application Priority Data
Nov. 3, 2020 (CN) .......................... 202011212587.4

(51) Int. Cl.
*G06F 3/048* (2013.01)
*G06F 3/023* (2006.01)
(52) U.S. Cl.
CPC .................................. *G06F 3/0233* (2013.01)
(58) Field of Classification Search
CPC ....................................................... G06F 3/0233
See application file for complete search history.

(56) References Cited

U.S. PATENT DOCUMENTS 11,489,845 B1 * 11/2022 Feng .................... H04L 63/1408
11,682,390 B2 * 6/2023 Temkin ................... G10L 15/22
704/275
(Continued)

FOREIGN PATENT DOCUMENTS

CN 101706690 A 5/2010
CN 102968190 A 3/2013
(Continued)

OTHER PUBLICATIONS

China National Intellectual Property Administration (ISA/CN), International Search Report Issued in Application No. PCT/CN2021/126207, Jan. 6, 2022, WIPO, 14 pages.
(Continued)

*Primary Examiner* — David Phantana-angkool
(74) *Attorney, Agent, or Firm* — Alleman Hall & Tuttle LLP

(57) ABSTRACT

Embodiments of the present disclosure provide an information input method, a system of a cloud input method and a client, where the method includes: generating an input method startup instruction according to received indication information, where the indication information is generated when a focus of an information input box is acquired; sending the input method startup instruction, where the input method startup instruction is used to startup a local input method; receiving text content, where the text content is content input by using the local input method; and submitting the text content to the information input box for display. According to the embodiments of the present disclosure, the local input method of the client can be called through the input method startup instruction, and a user uses the local input method commonly used by the client to input information, which greatly improves convenience of operations.

16 Claims, 11 Drawing Sheets

(56) References Cited

U.S. PATENT DOCUMENTS

| | | | |
|---|---|---|---|
| 2013/0106698 A1 | 5/2013 | Zhang et al. | |
| 2015/0238860 A1* | 8/2015 | Inoue | A63F 13/335 463/31 |
| 2017/0024100 A1* | 1/2017 | Pieper | G06F 40/40 |
| 2019/0332663 A1* | 10/2019 | Zhang | G06F 40/232 |
| 2020/0251111 A1* | 8/2020 | Temkin | G06F 16/2423 |
| 2021/0133269 A1* | 5/2021 | Shah | G06F 3/147 |
| 2021/0149906 A1* | 5/2021 | Li | G06F 16/24539 |
| 2021/0392053 A1* | 12/2021 | Singh | H04L 12/66 |
| 2022/0107802 A1* | 4/2022 | Rao | G06F 16/907 |
| 2022/0222418 A1* | 7/2022 | Ziraknejad | G06Q 10/10 |
| 2022/0398140 A1* | 12/2022 | Singh | G06F 9/54 |
| 2023/0029927 A1* | 2/2023 | Ziraknejad | G06F 21/6218 |
| 2023/0141807 A1* | 5/2023 | Groenewegen | G06F 8/33 717/106 |
| 2024/0069907 A1* | 2/2024 | Groenewegen | G06F 8/71 |
| 2024/0160436 A1* | 5/2024 | Imms | G06F 8/71 |

FOREIGN PATENT DOCUMENTS

| | | |
|---|---|---|
| CN | 104391576 A | 3/2015 |
| CN | 105653066 A | 6/2016 |
| CN | 105183180 B | 4/2018 |
| CN | 109783165 A | 5/2019 |
| CN | 110119321 A | 8/2019 |
| CN | 111078429 A | 4/2020 |
| CN | 111225053 A | 6/2020 |
| CN | 112328094 A | 2/2021 |

OTHER PUBLICATIONS

China National Intellectual Property Administration, Office action issued in Chinese Application No. 202011212587.4, Dec. 29, 2023, 17 pages. (Submitted with Concise Explanation of Relevance).

China National Intellectual Property Administration, Office Action and Search Report Issued in Application No. 202011212587.4, Jun. 17, 2024, 66 pages.

* cited by examiner

INFORMATION INPUT METHOD, SYSTEM OF CLOUD INPUT METHOD AND CLIENT

CROSS-REFERENCE TO RELATED APPLICATIONS

The present application is a national stage of International Application No. PCT/CN2021/126207, filed on Oct. 25, 2021, which claims priority to Chinese patent application No. 202011212587.4, filed on Nov. 3, 2020. Both of the aforementioned applications are hereby incorporated by reference in their entities.

TECHNICAL FIELD

Embodiments of the present disclosure relate to the technical field of computer, and in particular, to an information input method, a system of a cloud input method and a client.

BACKGROUND

Cloud game is a game mode based on cloud computing. In a running mode of the cloud game, all games run on a server side, and a cloud server renders game scenes into video and audio streams, and the rendered video and audio streams are transmitted to a player's game terminal through a network. The player's game terminal does not need to have powerful capabilities for graphics operation and data processing, but only needs to have basic capabilities to play streaming media and to obtain a player's input instruction and send it to the cloud server.

In related arts, when a player logs into a game and inputs account information through a game terminal and needs to input chat content during a game process, the game terminal will call a cloud input method, and the user will use the cloud input method to input text such as the account information and the chat content.

However, in actual situations, different players may be accustomed to use different input methods, and input method applications in operating systems of different game terminals are also different. Since existing applications of cloud input methods are undiversified, for example, a player can only input information through a 26-key input interface, it is highly inconvenient for quite a few users who are not used to using cloud input methods to input information, which leads to poor user experience.

SUMMARY

Embodiments of the present disclosure provide an information input method, a system of a cloud input method and a client, to overcome a problem of inconvenience for a user to use a cloud input method to input information, which reduces user experience, caused by that cloud input method applications are undiversified.

In a first aspect, an embodiment of the present disclosure provides an information input method, including:
generating an input method startup instruction according to received indication information, where the indication information is generated when a focus of an information input box is acquired;
sending the input method startup instruction, where the input method startup instruction is used to startup a local input method;
receiving text content, where the text content is content input by using the local input method;
submitting the text content to the information input box for display.

In a second aspect, an embodiment of the present disclosure provides an information input method, including:
generating indication information according to an acquired focus of an information input box;
sending the indication information, where the indication information is used to generate an input method startup instruction;
receiving the input method startup instruction, and starting up a local input method according to the input method startup instruction;
acquiring text content, where the text content is input through the local input method;
sending the text content, where the text content is used to be submitted to the information input box for display.

In a third aspect, an embodiment of the present disclosure provides a system of a cloud input method, including:
an instruction-generating module, configured to generate an input method startup instruction according to received indication information, where the indication information is generated when a focus of an information input box is acquired;
a first sending module, configured to send the input method startup instruction, where the input method startup instruction is used to startup a local input method;
a first receiving module, configured to receive text content, where the text content is content input by using the local input method;
a submitting module, configured to submit the text content to the information input box for display.

In a fourth aspect, an embodiment of the present disclosure provides a client, including:
an acquiring module, configured to generate indication information according to an acquired focus of an information input box;
a second sending module, configured to send the indication information, where the indication information is used to generate an input method startup instruction;
a second receiving module, configured to receive the input method startup instruction, and start up a local input method according to the input method startup instruction;
the acquiring module is further configured to acquire text content, where the text content is input through the local input method;
the second sending module is further configured to send the text content, where the text content is used to be submitted to the information input box for display.

In a fifth aspect, an embodiment of the present disclosure provides an electronic device, including: at least one processor and a memory;
the memory stores a computer-executable instruction;
the at least one processor executes the computer-executable instruction stored in the memory, to cause the at least one processor to perform the information input method according to the above first aspect and various possible designs of the first aspect, or the above second aspect and various possible designs of the second aspect.

In sixth aspect, an embodiment of the present disclosure provides a computer-readable storage medium, where the computer-readable storage medium stores a computer-executable instruction, and when a processor executes the computer-executable instruction, the information input method according to the above first aspect and various possible designs of the first aspect, or the above second aspect and various possible designs of the second aspect is implemented.

In a seventh aspect, an embodiment of the present disclosure provides a computer program product, including a computer program carried on a computer-readable storage medium, where when the computer program is executed by a processor, the information input method according to the above first aspect and various possible designs of the first aspect, or the above second aspect and various possible designs of the second aspect is implemented.

In an eighth aspect, an embodiment of the present disclosure provides a computer program, where when the computer program is executed by a processor, the information input method according to the above first aspect and various possible designs of the first aspect, or the above second aspect and various possible designs of the second aspect is implemented.

According to the information input method, the system of the cloud input method and the client provided by the embodiments of the present disclosure, an input method startup instruction is generated according to received indication information, where the indication information is generated when a focus of an information input box is acquired, and the input method startup instruction is sent to the client, where the input method startup instruction is used to indicate the client to start up the local input method, in such way, when inputting content such as account information and text information through the game interface of the client, the user can directly use the local input method of the client to input the text content, and the text content input by the user is acquired, and the text content is submitted to the information input box of the game interface for display. This process does not require the user to use a cloud's own input method, and instead, the local input method of the client is called through the input method startup instruction, and the user uses the local input method commonly used by the client to input information, which greatly improves convenience of operations, thereby improving experience of the user when operating games.

BRIEF DESCRIPTION OF DRAWINGS

In order to more clearly describe the embodiments of the present disclosure or the technical solutions in the prior art, the following will briefly describe the drawings that need to be used in the description of the embodiments or the prior art. Obviously, the drawings in the following description are some embodiments of the present disclosure. For those of ordinary skills in the art, other drawings may be obtained according to these drawings without making creative efforts.

DESCRIPTION OF EMBODIMENTS

In order to make the purpose, technical solution and advantages of the embodiments of the present disclosure clearer, the technical solution in the embodiments of the present disclosure will be clearly and completely described below with reference to the drawings in the embodiments of the present disclosure. Obviously, the described embodiments are part of the embodiments of the present disclosure, but not all of the embodiments. Based on the embodiments in the present disclosure, all other embodiments obtained by those of ordinary skills in the art without making creative efforts belong to the scope of protection of the present disclosure.

Cloud game is a game mode based on cloud computing. In a running mode of the cloud game, all games run on a server side, and a cloud server renders game scenes into video and audio streams, and the rendered video and audio streams are transmitted to a player's game terminal through a network. The player's game terminal does not need to have powerful capabilities for graphics operation and data processing, but only needs to have basic capabilities to play streaming media and to obtain a player's input instruction and send it to the cloud server.

Figure 1:
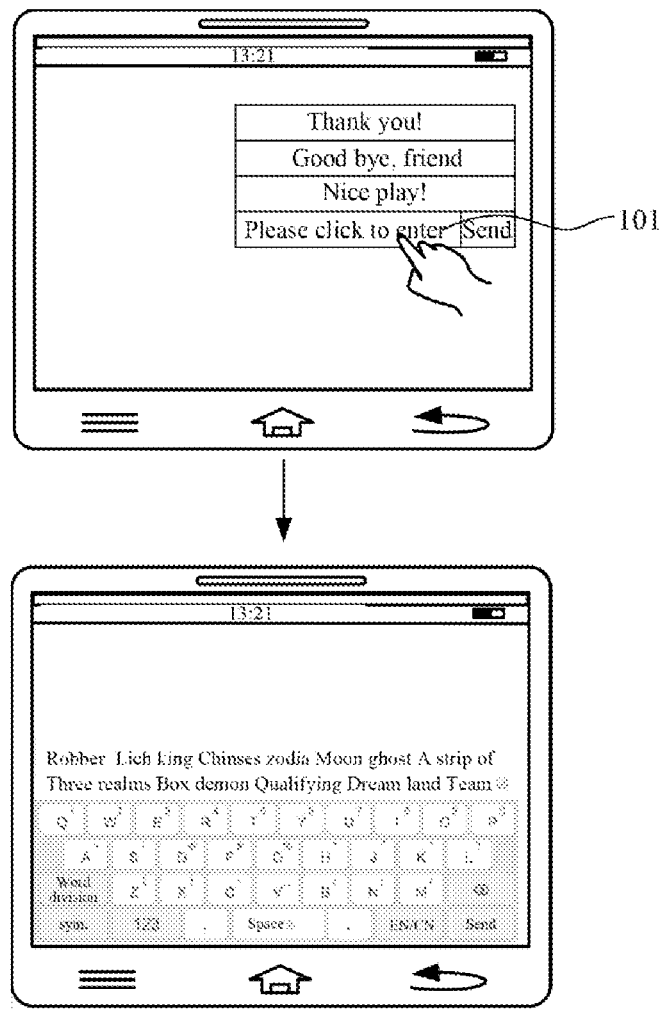
FIG. 1 is an example diagram of an input interface of an information input method in prior arts.

In related arts, when a player needs to log into a game and inputs account information through a game terminal and needs to input chat content during a game process, the game terminal will call a cloud input method, and the user will use the cloud input method to input text such as the account information and the chat content. However, in actual situations, input methods commonly used by different players are different, and input method applications in operating systems of different game terminals are also different. Since existing applications of cloud input methods are undiversified, as shown in FIG. 1, no matter what kind of terminal the user uses, when the user clicks an information input box 101 on an interface displayed by the terminal, a cloud input method interface that is called is a 26-key input interface. However, considering different habits of different users to use the input method, the diversity of input methods used by users and difference of operating systems of clients (ios or android), forcing users to use cloud input methods will make it very inconvenient for users to input information, which causes poor using experience of the users. In addition, functions of the cloud input method are undiversified, and only functions of inputting information such as numbers, characters, letters can be provided.

Figure 2:
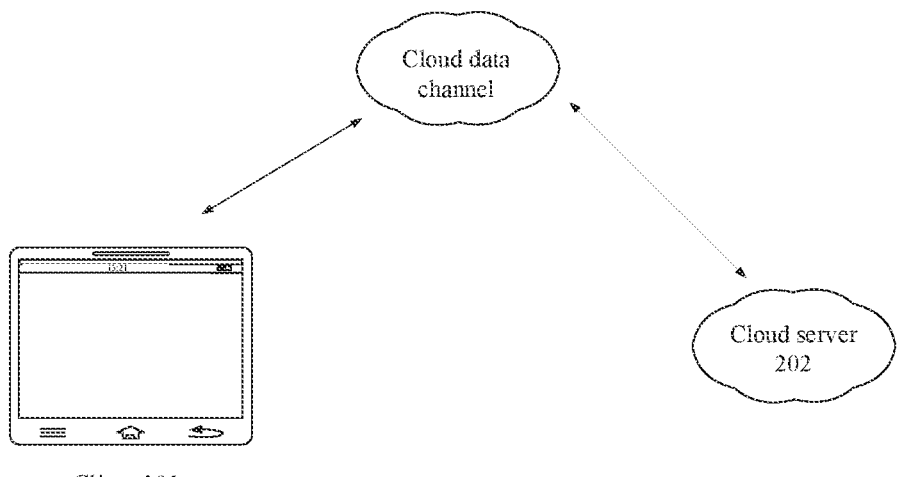
FIG. 2 is a first application scenario diagram of an information input method provided by an embodiment of the present disclosure.

FIG. 2 is a first application scenario diagram of an information input method provided by an embodiment of the present disclosure.

As shown in FIG. 2, a basis architecture of the application scenario diagram provided by the present embodiment mainly includes a client 201 and a cloud server 202; where a system of a cloud input method is deployed in the cloud server, all cloud games operated by a user through the client are running in the cloud server, the cloud server renders game scenes into video and audio streams, and sends the rendered video and audio streams to the client through a network. When the user logs into the game and inputs account information through the client or needs to input chat content in a game process, the system of the cloud input method in the cloud server sends an input method startup instruction to the client through a cloud data channel, and the client starts up a local input method according to the input method startup instruction, the user uses the local input method of the client to input information, and the client sends the information input by the user to the system of the cloud input method through the cloud data channel, and the system of the cloud input method submits the input information to the information input box of the game interface for display.

Figure 3:
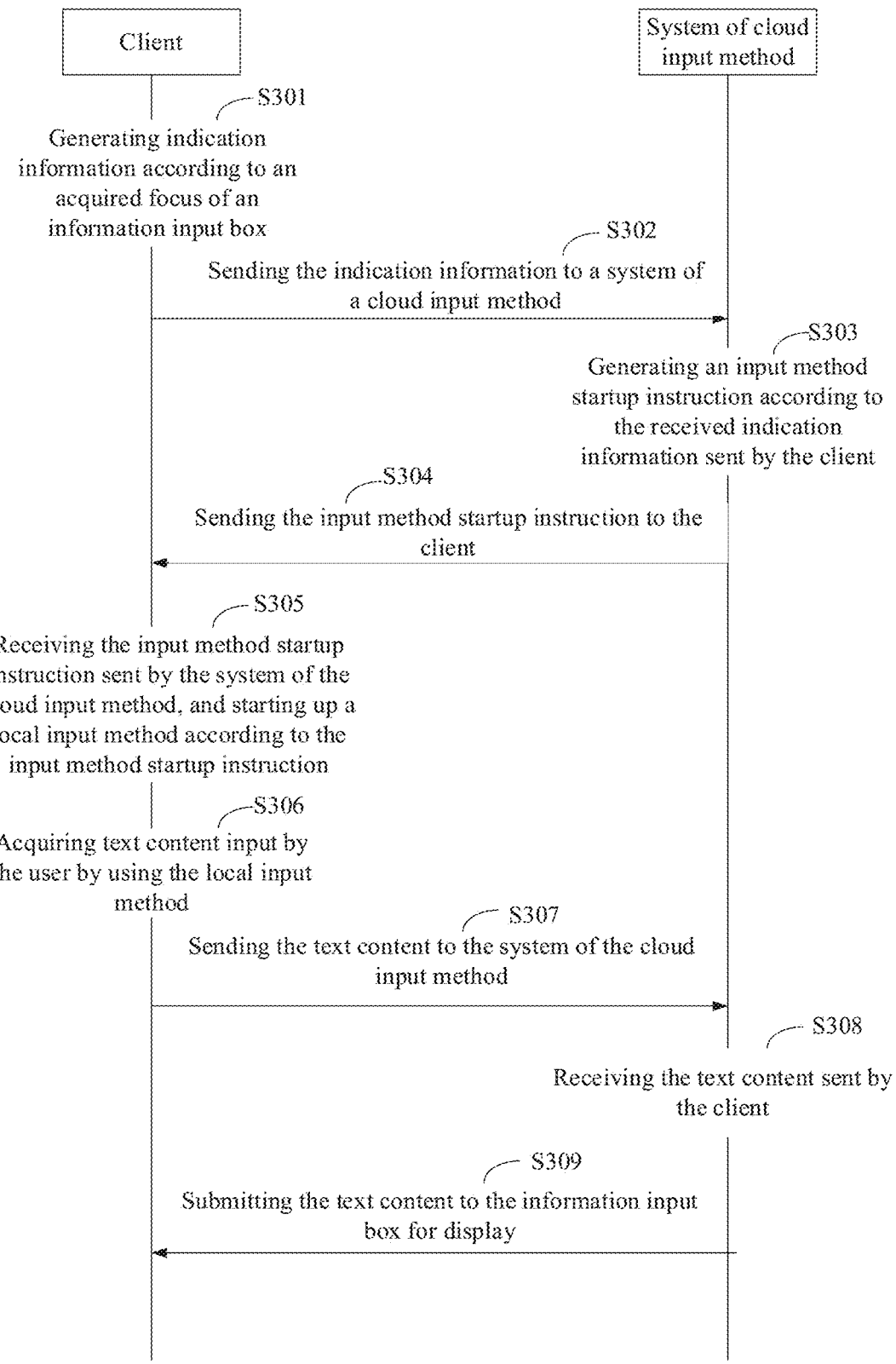
FIG. 3 is a first schematic flowchart of an information input method provided by an embodiment of the present disclosure.

FIG. 3 is a first schematic flowchart of an information input method provided by an embodiment of the present disclosure. In the embodiment of the present disclosure, the interactive execution between the client and the system of the cloud input method is taken as an example to describe the information input method.

As shown in FIG. 3, the method provided by the embodiment of the present disclosure may include the following steps.

S301, a client generates indication information according to an acquired focus of an information input box.

Specifically, when a user logs into a game and inputs account information through the client or needs to input chat content in a game process, the user clicks on the information input box in a display interface of the client, and the client acquires the focus of the information input box and generates the indication information, the indication information includes a type of information to be input corresponding to the information input box.

Figure 7A:
FIG. 7a is a first display diagram of a game interface of a client provided by an embodiment of the present disclosure.

Illustratively, as shown in FIG. 7a, in a game log-in interface of the user, the user needs to input a mobile phone number to log into the game, the user clicks on an input box "Please enter mobile phone number" in the log-in interface, the client acquires the focus of the input box, and displays a cursor in the input box, at the same time, the client generates the indication information, and since what needs to be input into the input box is the mobile phone number, the type of the information to be input included in the generated indication information is numbers.

It shall be understood that, when the user needs to send information to teammates in the game process, the user needs to click on the information input box in the game interface. Since the information input into the information input box in the game interface may be text or numbers, the type of the information to be input included in the indication information is text and numbers.

S302, the client sends the indication information to a system of a cloud input method.

S303, the system of the cloud input method generates an input method startup instruction according to the received indication information sent by the client.

Specifically, after the client sends the generated indication information to the system of the cloud input system, the system of the cloud input method generates the corresponding input method startup instruction according to the type of the information to be input included in the indication information, where the input method startup instruction includes an input method type (e.g., types such as text, numbers, passwords). The type of the information to be input included in the indication information is consistent with the input method type included in the input method startup instruction, for example, if the type of the information to be input included in the indication information is numbers, the input method type in the input method startup instruction is also numbers.

S304, the system of the cloud input method sends the input method startup instruction to the client.

S305, the client receives the input method startup instruction sent by the system of the cloud input method, and starts up a local input method according to the input method startup instruction.

Specifically, after receiving the input method startup instruction sent by the system of the cloud input method, the client calls a local input method of the client, and displays a corresponding input method interface according to the input method type in the input method startup instruction.

Figure 7B:
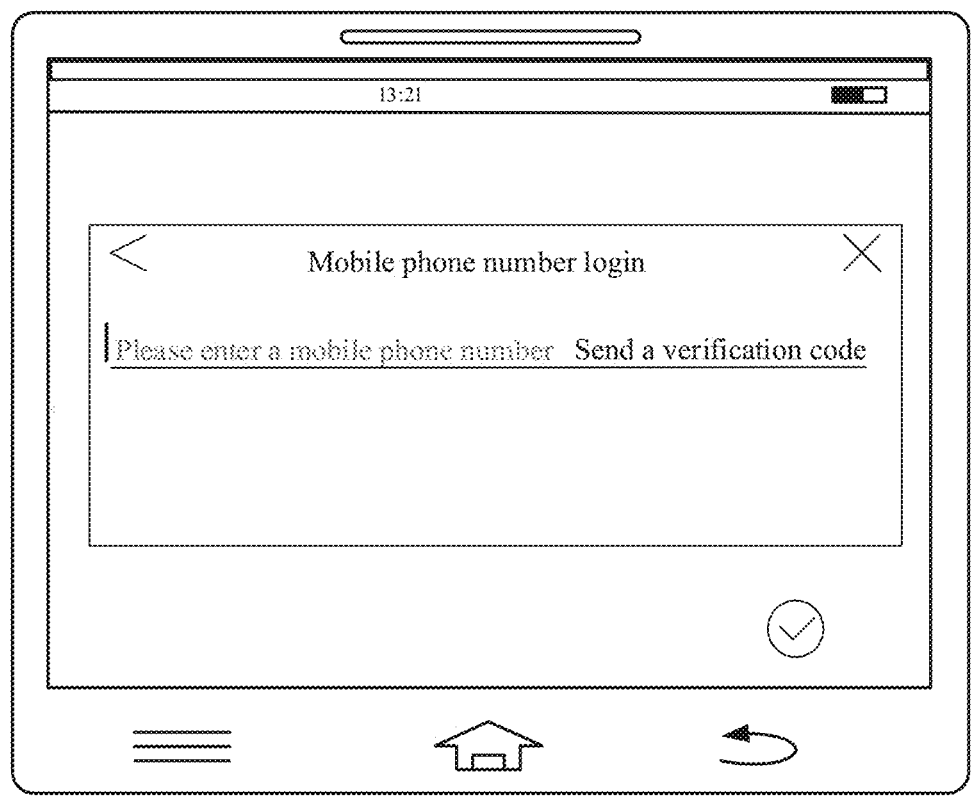
FIG. 7b is a second display diagram of a game interface of a client provided by an embodiment of the present disclosure.

Illustratively, as shown in FIG. 7b, in the game log-in interface of the user, the user needs to input a mobile phone number to log into the game, the type of the information to be input included in the indication information generated by the client after acquiring the focus of the input box is numbers. Therefore, the input method type included in the input method startup instruction generated according to the indication information is also numbers. Then, the client calls and displays a number input interface of the local input method according to the input method startup instruction, where the number input interface includes number input controls (0, 1, 2, 3, 4, 5, 6, 7, 8 and 9), the user clicks on a control corresponding to a number to input the corresponding number.

S306, the client acquires text content input by the user by using the local input method.

S307, the client sends the text content to the system of the cloud input method.

S308, the system of the cloud input method receives the text content sent by the client.

S309, the system of the cloud input method submits the text content to the information input box for display.

Specifically, the client acquires the text content input by the user by using the local input method, and sends the text content to the system of the cloud input method, and the system of the cloud input method submits the text content to the information input box for display.

Figure 7C:
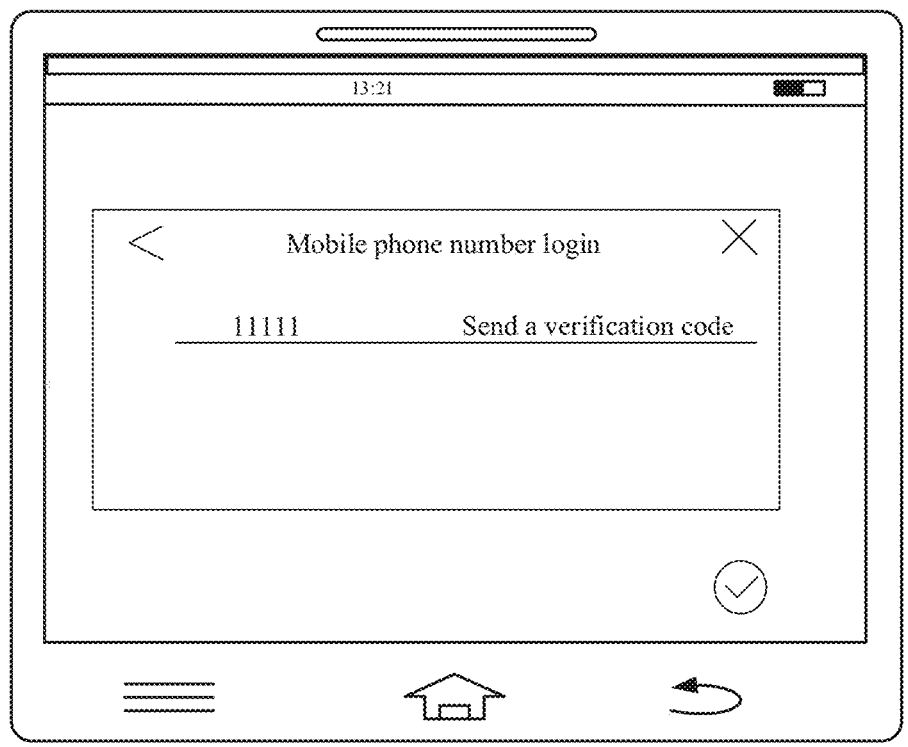
FIG. 7c is a third display diagram of a game interface of a client provided by an embodiment of the present disclosure.

Illustratively, as shown in FIG. 7c, when the user logs into the game by using the mobile phone number in the game log-in interface, the number input interface of the local input method is called, and the user clicks on the control corresponding to the number to input the corresponding number. For example, the user clicks on an input control of number 1 for 5 times, and then the client sends the text content "11111" to the system of the cloud input method, and the system of the cloud input method submits the "11111" to the current input box, and the "11111" is displayed in the current input box.

In the present embodiment, the client generates the indication information according to the acquired focus of the information input box, the system of the cloud input method generates the corresponding input method startup instruction according to the indication information, and the input method startup instruction is sent to the client by the system of the cloud input method, to cause the client to call the local input method and display the corresponding input method interface according to the input method startup instruction, in this way, the user can directly use the local input method of the client to implement input of information. This process does not require the user to use a cloud's own input method, instead, the local input method of the client is called by virtue of the input method startup instruction, and the user uses the local input method commonly used by the client to input information, which greatly improves convenience of operations, thereby improving experience of the user when operating games.

Figure 4:
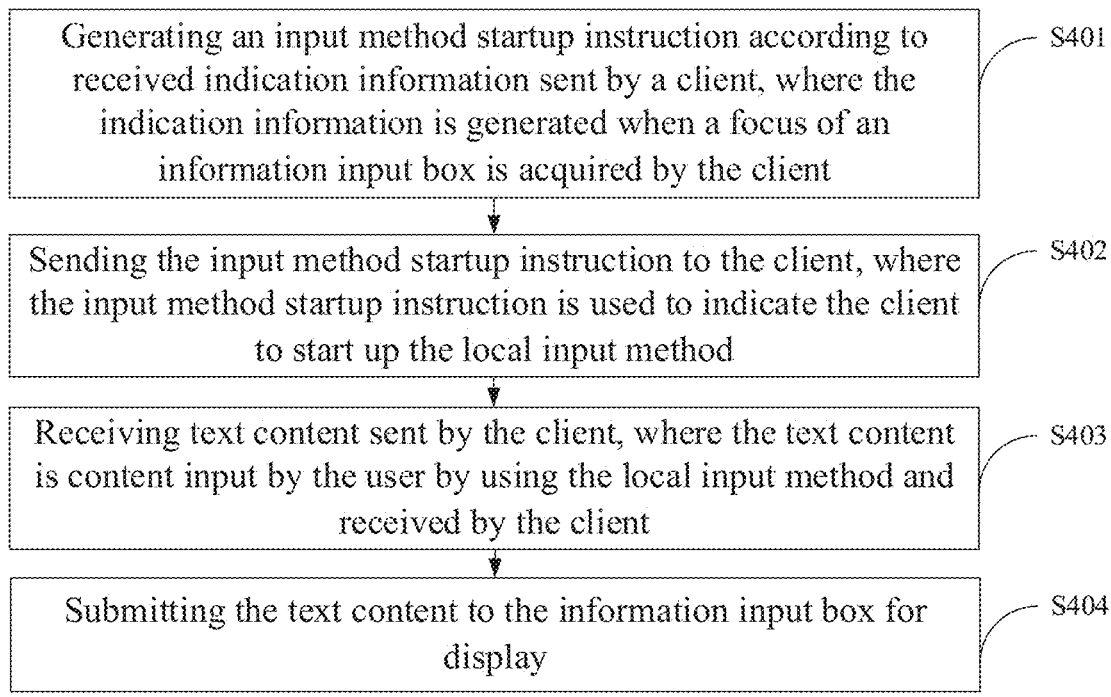
FIG. 4 is a second schematic flowchart of an information input method provided by an embodiment of the present disclosure.

FIG. 4 is a second schematic flowchart of an information input method provided by an embodiment of the present disclosure. In the embodiment of the present disclosure, the execution on the one side of the system of the cloud input method deployed in the cloud server is taken as an example to describe the information input method.

As shown in FIG. 4, the method provided by the embodiment of the present disclosure may include the following steps.

S401, generating an input method startup instruction according to received indication information sent by a client, where the indication information is generated when a focus of an information input box is acquired by the client.

Specifically, when a user logs into a game and inputs account information through the client or needs to input chat content in a game process, the user clicks on the information input box in a display interface of the client, and the client acquires the focus of the information input box and generates the indication information, the indication information includes a type of information to be input corresponding to the information input box. After the client sends the generated indication information to the system of the cloud input system, the system of the cloud input method generates the corresponding input method startup instruction according to the type of the information to be input included in the indication information, where the input method startup instruction includes an input method type (e.g., types such as text, numbers, passwords). The type of the information to be input included in the indication information is consistent with the input method type included in the input method startup instruction, for example, if the type of the information to be input included in the indication information is numbers, the input method type in the input method startup instruction is also numbers, and if the type of the information to be input included in the indication information is text, the input method type in the input method startup instruction is also text.

Figure 8A:
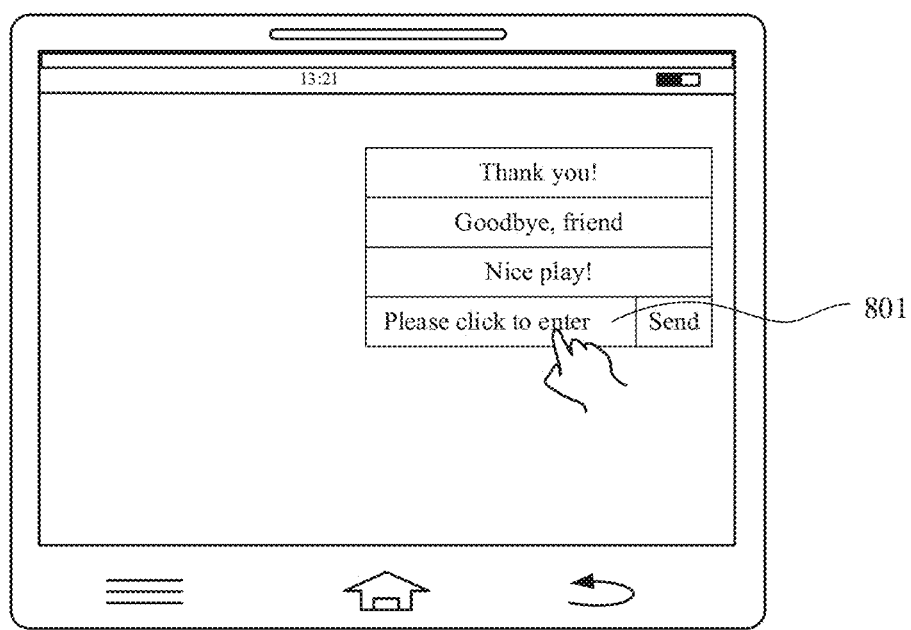
FIG. 8a is a fourth display diagram of a game interface of a client provided by an embodiment of the present disclosure.

Illustratively, as shown in FIG. 8a, when the user needs to send information to teammates in the game process, the user needs to click on the information input box 801 in the game interface, the client acquires the focus of the information input box, and generates the indication information. Since the information input by the user through the information input box may be text or numbers, the type of the information to be input included in the indication information may be text and numbers. The two types of the input method, that is, text and numbers, are included in the input method startup instruction generated by the system of the cloud input method according to the indication information.

S402, sending the input method startup instruction to the client, where the input method startup instruction is used to indicate the client to start up the local input method.

Specifically, the system of the cloud input method sends the generated input method startup instruction to the client, and the client calls the local input method according to the input method startup instruction, and displays the corresponding input method interface according to the input method type.

Figure 8B:
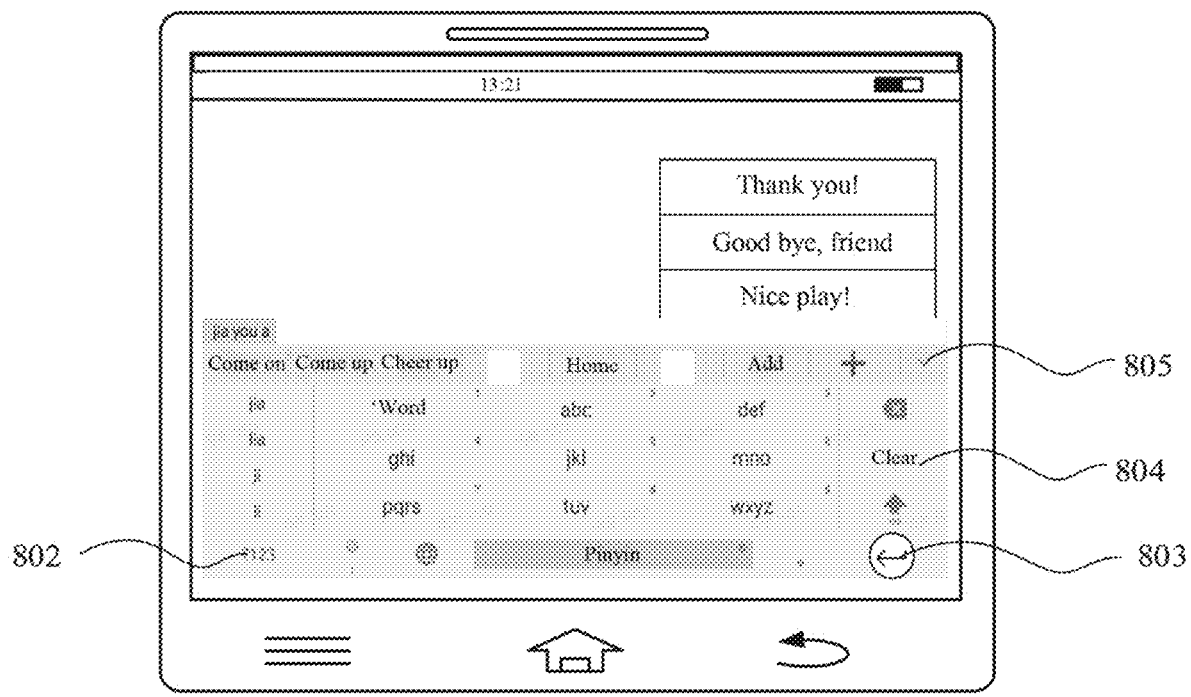
FIG. 8b is a fifth display diagram of a game interface of a client provided by an embodiment of the present disclosure.

Illustratively, the description continues with the example in step S401. As shown in FIG. 8b, when the user needs to send information to the teammates in the game process, the input method startup instruction generated by the system of the cloud input method includes the two types of the input method, i.e., text and numbers, hence, after the input method type is sent to the client, the client calls a pinyin input interface in the local input method, where the pinyin input interface includes pinyin input controls and a number option control 802, the user inputs text through the pinyin input controls, for example, the text content input by the user through the pinyin input controls is "Come on".

It shall be noted that, if the user wants to input numbers, the user can click the number option control 802 to switch the input method interface to a number input interface to input numbers.

S403, receiving text content sent by the client, where the text content is content input by the user by using the local input method and received by the client.

S404, submitting the text content to the information input box for display.

Specifically, the client acquires the text content input by the user by using the local input method, and when receiving a confirm instruction input by the user, the client sends the text content to the system of the cloud input method, and the system of the cloud input method submits the text content to the information input box for display.

Figure 8C:
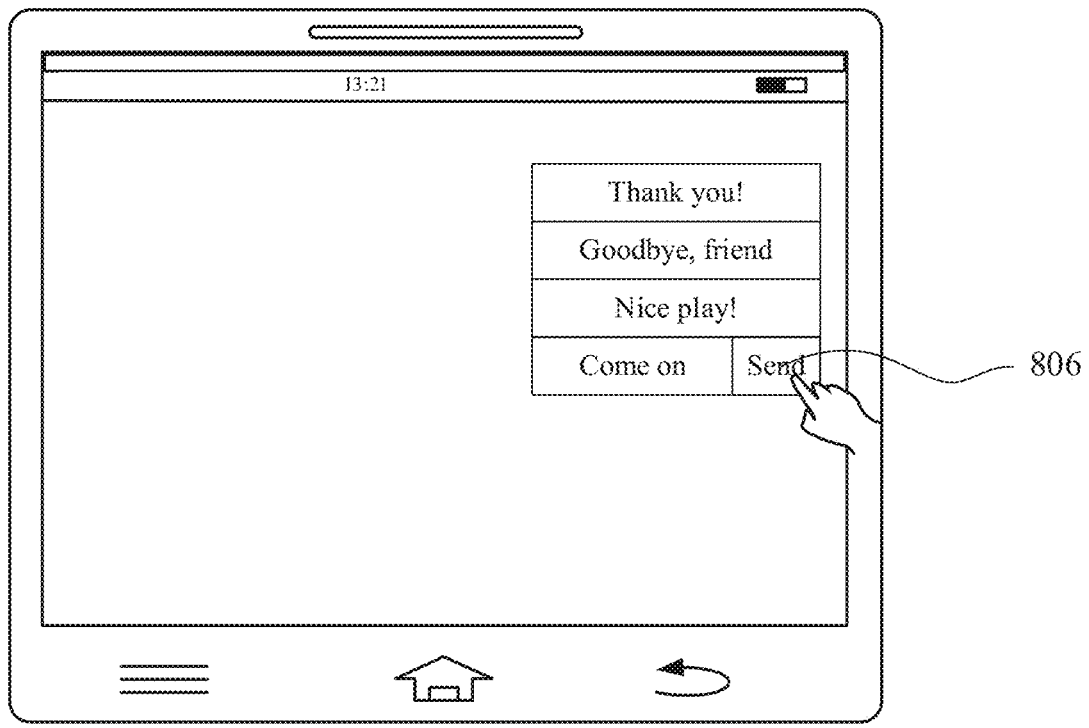
FIG. 8c is a sixth display diagram of a game interface of a client provided by an embodiment of the present disclosure.
Figure 8D:
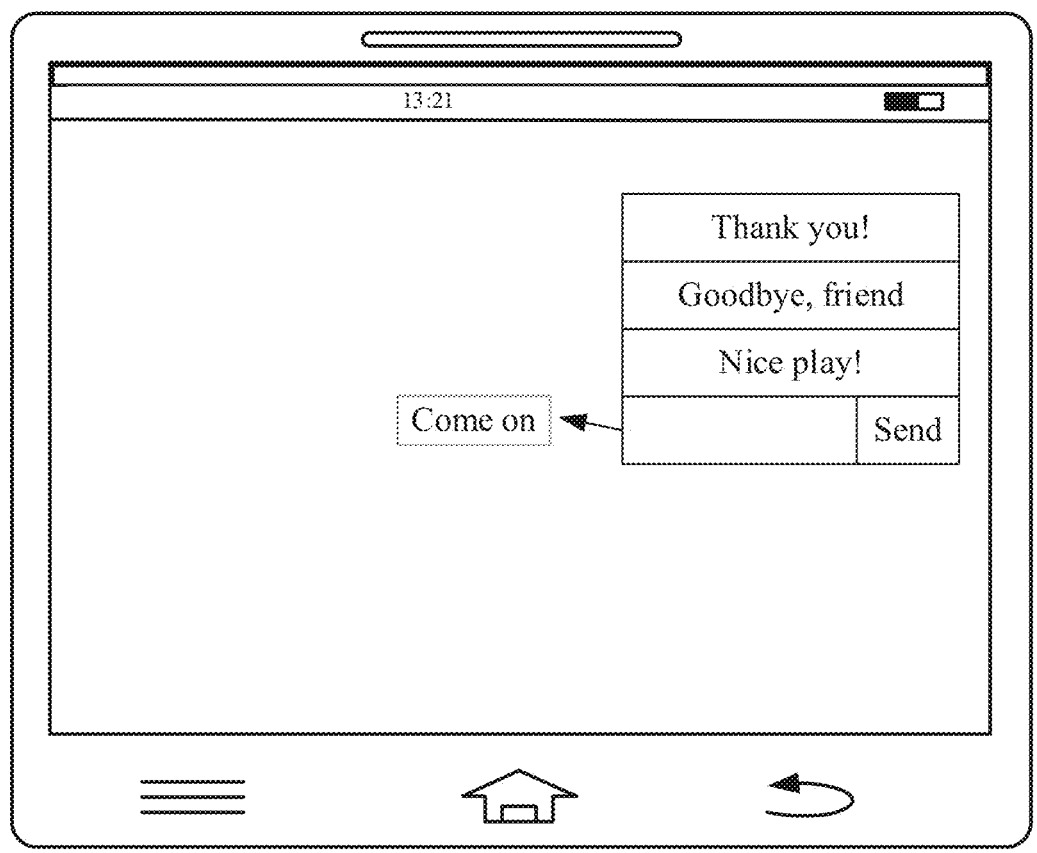
FIG. 8d is a seventh display diagram of a game interface of a client provided by an embodiment of the present disclosure.

Illustratively, as shown in FIG. 8b, after finishing inputting the text content "Come on" in the input method interface, the user clicks on a confirm operation control 803, and the client sends the text content "Come on" to the system of the cloud input method, the system of the cloud input method submits the text content "Come on" to the information input box of the game interface for display. As shown in FIG. 8c, when the user clicks on a sending button 806 corresponding to the information input box of the game interface, the system of the cloud input method sends the text content "Come on" to the game interface and displays the same to the teammates, as shown in FIG. 8d.

It should be noted that in the present embodiment, the confirm operation control can be identified by an enter symbol. In some other embodiments, the confirm operation control can be identified by an arrow symbol, or by words such as "Confirm" or "Send".

In a possible embodiment of the present disclosure, the input method startup instruction not only includes the input method type, but also includes text to be displayed in the current information input box and an operation identifier corresponding to at least one functional operation; where the input method type and the operation identifier are used to indicate the client to start up a corresponding input method and to display an input method interface, where the input method interface includes a candidate up-screen area, an information input control corresponding to the input method type, and a functional operation control corresponding to the operation identifier.

Specifically, the functional operation includes any one or more of the following: sending, searching, going to the next step, going to the last step, completing, going back, clearing and exiting. These functional operations may be operations customized by the input method, or may be user-defined operations, and each functional operation corresponds to one operation identifier, such as an operation identifier corresponding to a sending operation is 01, an operation identifier corresponding to a searching operation is 02, and so on. After the client receives the input method startup instruction sent by the system of the cloud input method, the client parses the input method startup instruction to obtain the input method type, the text to be displayed in the current information input box of the game interface, and the operation identifier corresponding to each functional operation. The client calls and displays the corresponding input method interface according to the input method type and the operation identifier corresponding to the functional operation, where the input method interface includes the candidate up-screen area, the information input control corresponding to the input method type, and the functional operation control corresponding to the operation identifier. As shown in FIG. 8b, the candidate up-screen area included in the input method interface is an area where the text content "Come on" is located, and the information input control is the pinyin input control in FIG. 8b.

It shall be noted that, the client displays the corresponding functional operation control according to whether the operating system supports the corresponding functional operation. For example, the operating system of the client does not support a "search function" and a "next step function" of the input method, but only supports a "clear function", a "complete function", etc., as shown in FIG. 8b, the input method display interface called and displayed by the client according to the input method startup instruction does not display a search function control and a next step function control. If the client supports the "search function" and the "next step function" of the input method, as shown in a in FIG. 9, the search function control 901 and the next step function control 902 are displayed in the input method interface called and displayed by the client according to the input method startup instruction.

In a possible embodiment of the present disclosure, the method further includes: the system of the cloud input method receiving a target operation identifier corresponding to a target functional operation control which is operated by the user and sent by the client; the system of the cloud input method executes the functional operation corresponding to the target operation identifier.

Specifically, the input method interface displayed by the client includes a plurality of functional operation controls, for example, the input method interface in FIG. 8b includes the confirm operation control 803, the clear operation control 804, etc., and when the user clicks on the confirm operation control 803, the client will send the confirm operation identifier corresponding to the confirm operation control to the system of the cloud input method, and the system of the cloud input method generates an information sending instruction according to the confirm operation identifier, and sends the information sending instruction to the client, and the client sends the text content "Come on" to the system of the cloud input method according to the information sending instruction.

Under one circumstance of the embodiment of the present disclosure, the target operation identifier is an exit operation identifier corresponding to an exit functional operation control, and the executing the functional operation corresponding to the target operation identifier includes: generating an input method removing instruction according to the exit operation identifier; sending the input method removing instruction to the client, where the input method removing instruction is configured to indicate the client to remove the input method interface.

Specifically, when the user no longer needs to input information any more, as shown in FIG. 8b, the user can click on the exit functional operation control 805 in the input method interface, and the client sends the exit operation identifier corresponding to the exit functional operation control to the system of the cloud input method, the system of the cloud input method generates the input method removing instruction according to the exit operation identifier, and sends the input method removing instruction to the client, and the client removes the input method interface according to the input method removing instruction.

In a possible embodiment, as shown in FIG. 8b, after the user finishes inputting the text content, and after the user clicks on the confirm operation control 803 to send the text content to the system of the cloud input method, and after the system of the cloud input method submits the text content to the information input box of the game interface, the system of the cloud input method will also automatically generate the input method removing instruction according to the confirm operation identifier corresponding to the confirm operation control, and send the input method removing instruction to the client, to remove the input method display interface of the client.

In an embodiment of the present disclosure, the submitting the text content to the information input box for display includes: replacing the text to be displayed in the information input box with the text content.

Specifically, when the user clicks on the information input box to input information, the current information input box may include some text displayed by default (i.e. the text to be displayed), the indication information generated by the client acquiring the focus of the information input box will also include the text to be displayed in the current information input box, and the input method startup instruction generated by the system of the cloud input method according to the indication information also includes the text to be displayed. After the system of the cloud input method sends the input method startup instruction to the client, and after the client calls and displays the input method display interface of the local input method, the client will submit the text to be displayed to the candidate up-screen area in the input method display interface of the client. The user modifies the text to be displayed in the candidate up-screen area through the input method interface of the client, to obtain final text content, and the client sends the final text content to the system of the cloud input method, and the system of the cloud input method replaces all text to be displayed in the current information input box with the final text content.

Figure 9:
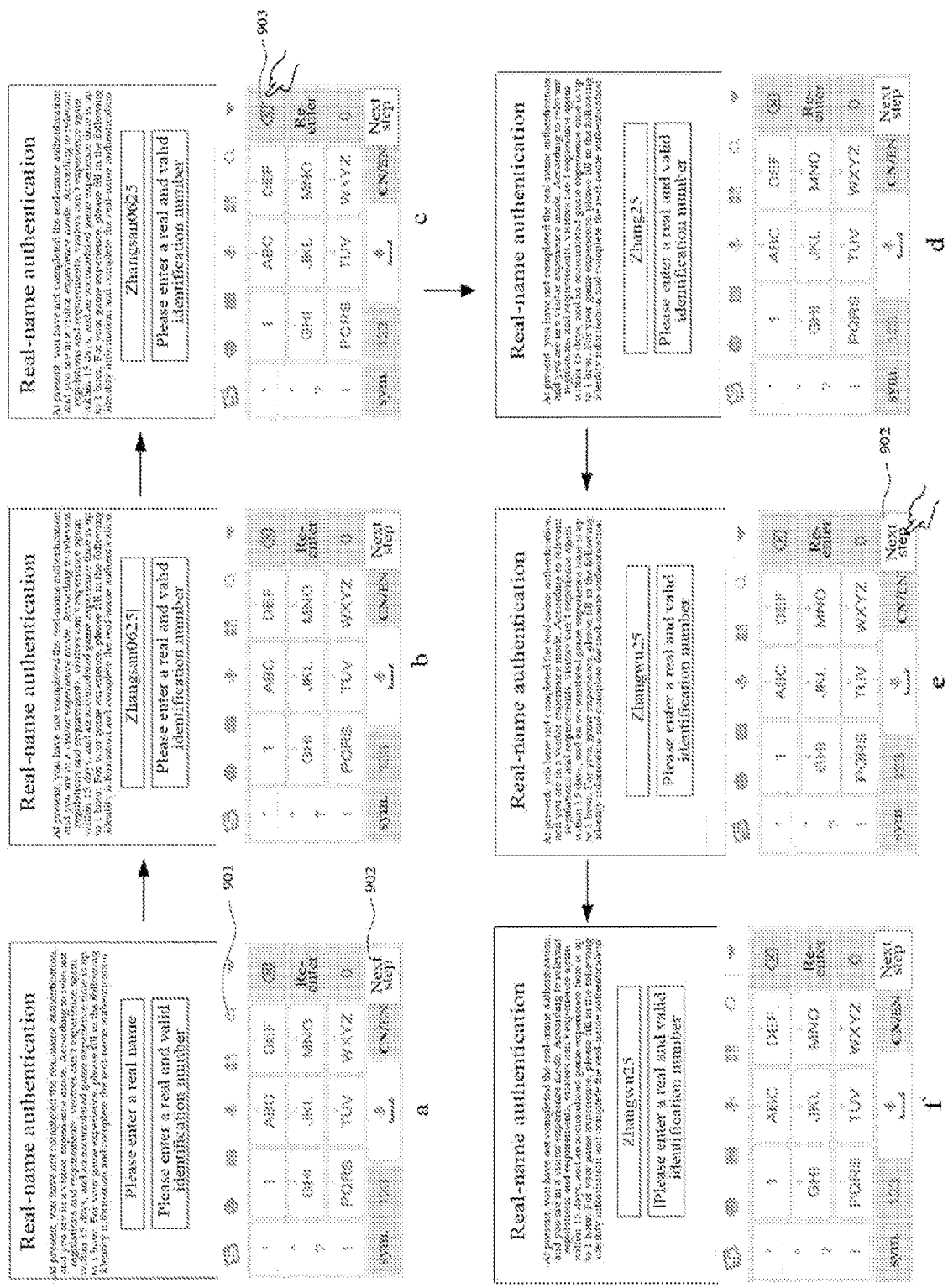
FIG. 9 is an eighth display diagram of a game interface of a client provided by an embodiment of the present disclosure.

Illustratively, as shown in a of FIG. 9, the user inputs "Zhangsan0625" in a name information input box in a game real-name authentication interface. The client sends "Zhangsan0625" to the system of the cloud input method, and the system of the cloud input method submits "Zhangsan0625" to the name information input box for display, as shown in b of FIG. 9. If the user wants to modify the name, the user directly clicks on the name information input box, so that a focus of the name information input box of the client is acquired, and the local input method interface of the client is called, as shown in c of FIG. 9. The user clicks on the name information input box to position the cursor before a number "25", and clicks on a delete operation control 903 in the input method interface to delete characters "san06", and the content combination is "Zhang25" after the client deletes characters "san06", and the client sends characters "Zhang05" to the system of the cloud input method, and the system of the cloud input method replaces "Zhangsan0625" in the current name information input box with "Zhang25", as shown in d of FIG. 9, and at this time, the name information input box only includes characters "Zhang25". The cursor is positioned after the character "Zhang", and character "wu" is input again, the client sends the new text content combination "Zhangwu25" to the system of the cloud input method, and the system of the cloud input method replaces the text "Zhang25" in the current name information input box with the text "Zhangwu25", as shown in e of FIG. 9, and finally the information in the name information input box is "Zhangwu25".

In the present embodiment, the system of the cloud input method will send all content located before the cursor in the current input box every time, after updating local content and combining the input content, the client sends them back to the system of the cloud input method. The system of the cloud input method replaces the text to be displayed in the current information input box with the final text content which is obtained after the input content of the client has been combined, so that the insertion/deletion of content in any cursor position is achieved.

Further, as shown in e of FIG. 9, after the name is input into the name information input box, the next step operation control 902 in the input method display interface of the client is clicked on, and the client sends the next step operation identifier corresponding to the next step operation control to the system of the cloud input method, the system of the cloud input method executes the next step functional operation according to the next step operation identifier, that is, the cursor automatically jumps to a next identification card number input box, as shown in f of FIG. 9.

In the present embodiment, not only that the user uses the local input method of the client to input information is realized, thus improving the convenience of information input operation for the user; furthermore, text can be freely inserted or deleted at any cursor position for the input content in the information input box in the game interface; furthermore, specific functions of the input method, such as functional operations of going to the next step, searching, sending, can also be realized.

Figure 5:
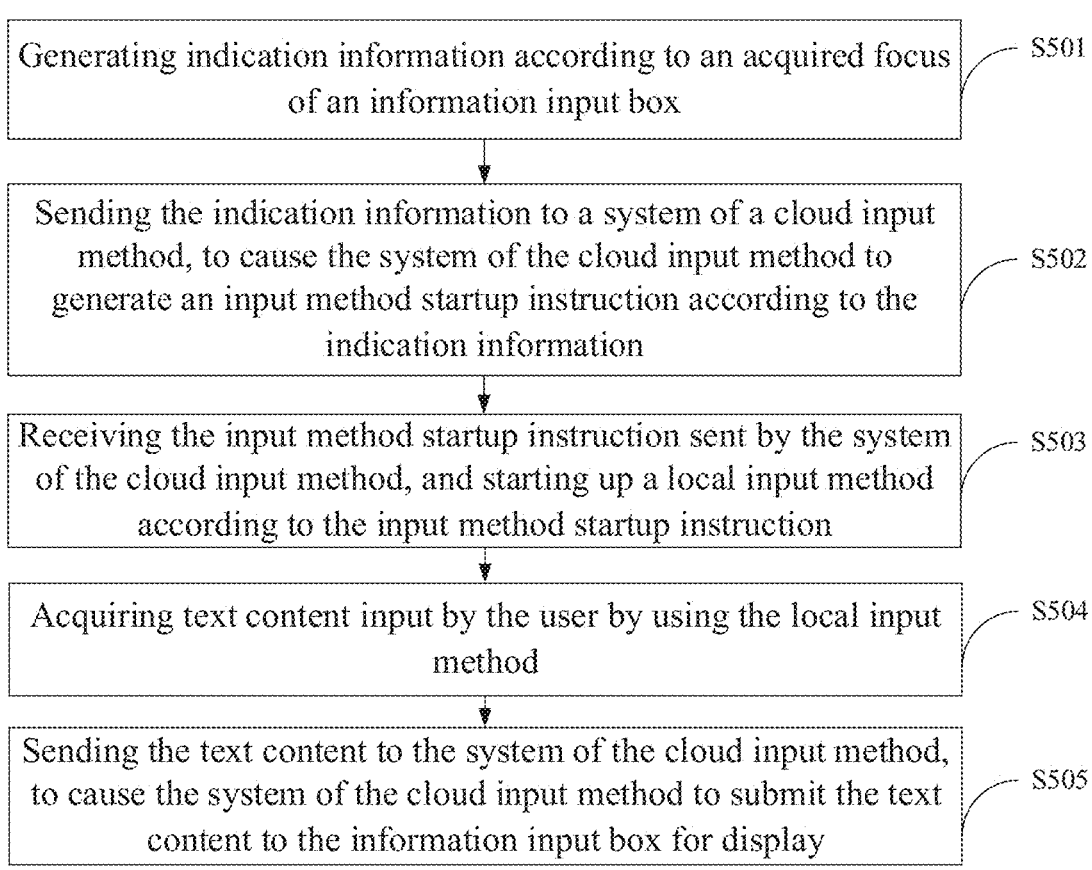
FIG. 5 is a third schematic flowchart of an information input method provided by an embodiment of the present disclosure.

FIG. 5 is a third schematic flowchart of an information input method provided by an embodiment of the present disclosure. In the embodiment of the present disclosure, the execution on the one side of client is taken as an example to describe the information input method.

As shown in FIG. 5, the method provided by the embodiment of the present disclosure may include the following steps.

S501, generating indication information according to an acquired focus of an information input box.

S502, sending the indication information to a system of a cloud input method, to cause the system of the cloud input method to generate an input method startup instruction according to the indication information.

S503, receiving the input method startup instruction sent by the system of the cloud input method, and starting up a local input method according to the input method startup instruction.

S504, acquiring text content input by the user by using the local input method.

S505, sending the text content to the system of the cloud input method, to cause the system of the cloud input method to submit the text content to the information input box for display.

In a possible embodiment, the input method startup instruction includes text to be displayed in a current information input box, an input method type and an operation identifier corresponding to at least one functional operation, the starting up a local input method according to the input method startup instruction includes: starting up a corresponding input method and displaying an input method interface according to the input method type and the operation identifier, where the input method interface includes a candidate up-screen area, an information input control corresponding to the input method type, and a functional operation control corresponding to the operation identifier; submitting the text to be displayed to the candidate up-screen area for display.

In a possible embodiment, the method further includes:
sending a target operation identifier corresponding to a target functional operation control operated by the user to the system of the cloud input method, where the target operation identifier is used to indicate the system of the cloud input method to execute the functional operation corresponding to the target operation identifier.

In a possible embodiment, the functional operation includes any one or more of the following: sending, searching, going to the next step, going to the last step, completing and exiting.

In a possible embodiment, the target operation identifier is an exit operation identifier corresponding to an exit functional operation control, where the exit operation identifier is used to indicate the system of the cloud input method to generate an input method removing instruction according to the exit operation identifier, the method further includes: receiving the input method removing instruction sent by the system of the cloud input method; removing the input method interface according to the input method removing instruction.

It should be noted that, for the specific implementation of each step of the method provided by the embodiment of the present disclosure, reference can be made to the above description of the relevant method embodiments, which will not be repeated here.

In order to better understand the present disclosure, the implementation of each step in the information input method will be described below with reference to the application scenario diagram of the information input method shown in FIG. 6.

Figure 6:
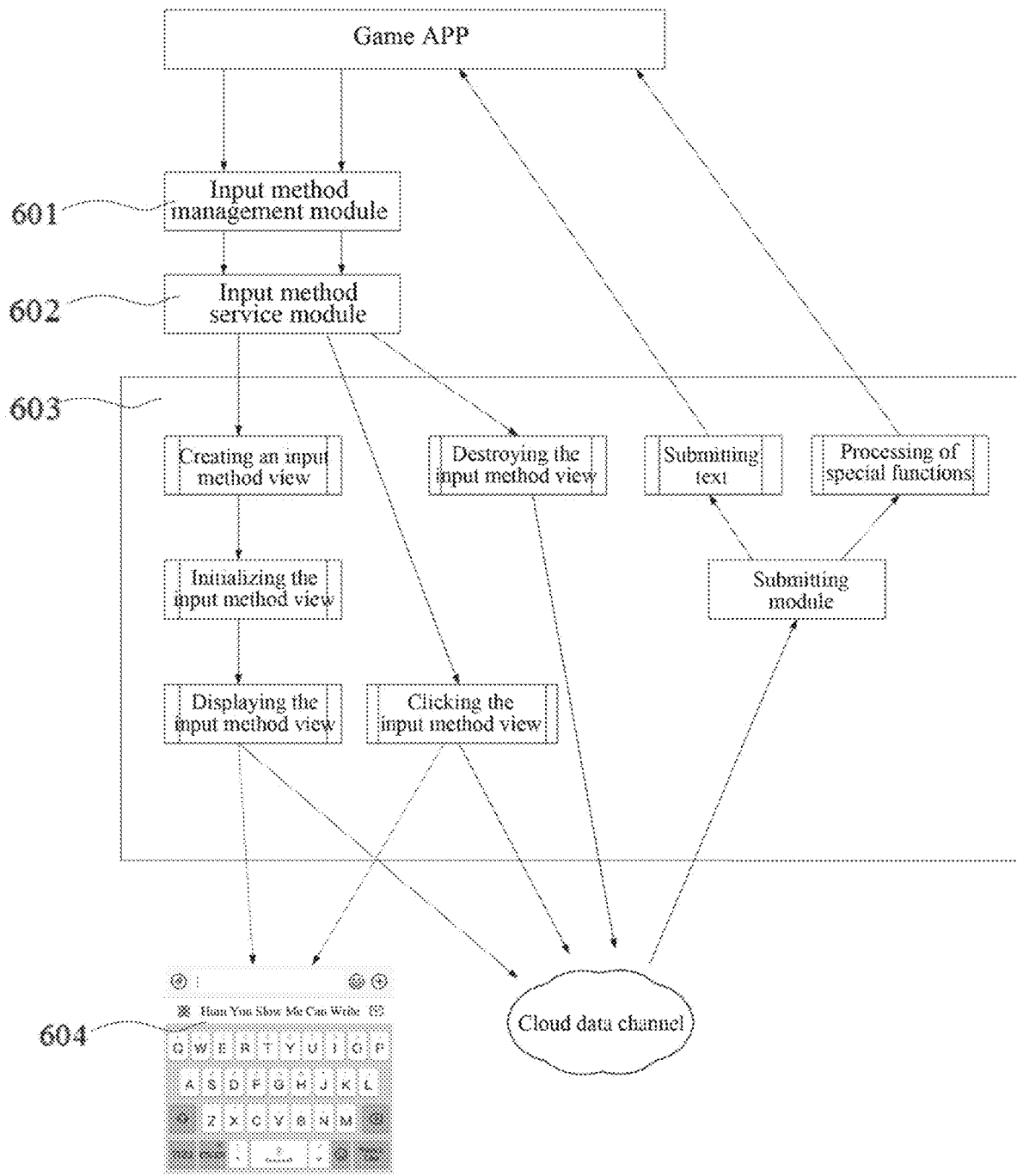
FIG. 6 is a second application scenario diagram of an information input method provided by an embodiment of the present disclosure.

As shown in FIG. 6, the application scenario diagram provided in the present embodiment includes: a game application (APP) and a system of a cloud input method; where a game picture of the game APP is displayed through a client; the system of the cloud input method includes an input method management module 601 (i.e. InputMethodManager module), an input method service module 602 (i.e. InputMethodService module), and an input method processing module 603.

Specifically, when the user clicks on an input box in the game APP, the input box of the client acquires a focus and generates indication information and sends the indication information to the InputMethodManager module, the InputMethodManager module initiates an input method startup instruction, the input method startup instruction is sent to the input method processing module through the InputMethodService module. After that, an input method view is created by calling back an onCreateInputView function in the input method processing module, and then an onStartInputView function in the input method processing module is called back to initialize the input method view, so that the input method view carries parameters such as an input method type, an operation identifier corresponding to at least one functional operation key, etc. The input method type may be, for example, a password input, a digital input or an ordinary text input, etc. Finally, an onWindowShown function in the input method processing module is called to display the input method view. For ordinary input methods, a virtual keyboard 604 will pop up at this time, and information can be input by clicking on keys in the input method view. However, for the input method processing module, at this time, the input method processing module will send the input method startup instruction to the client through a cloud data channel, and the client receives the input method startup instruction to start up the local input method interface of the client.

Further, after the local input method of the client is started up, the user can use a touch screen or physical keys of the client to input text. When there is text input, the client sends the input text to the input method processing module through the cloud data channel, and the input method processing module calls a submitting module (i.e., InputConnection module) to execute a corresponding submission method commitText, to submit the input text to the information input box of the game APP interface; if the client receives a user's operation on a special function key, the client sends the operation identifier corresponding to the function key operated by the user to the input method processing module, and the input method processing module sends back the instruction of the special function key corresponding to the operation identifier, and the input method processing module calls a performEditorAction function of the InputConnection module to complete processing of special functions, such as sending, searching, going to the next step and so on.

Furthermore, when the user clicks on a send content button in the game APP interface, the input box loses the focus, at this time, the InputMethodManager module initiates an input ending instruction. For the ordinary input method, the input method processing module receives the input ending instruction through the InputMethodService module, and then calls back an onFinishInputView function to execute an action of destroying the input method view. For the present solution, the input method processing module will generate an input method destroying instruction at this time, and send the input method destroying instruction to the client through the cloud data channel, and client executes the input method destroying instruction to remove the input method interface in the display interface of the client.

It should be noted that in the above embodiments, the parts not described in detail can be referred to each other.

Figure 10:
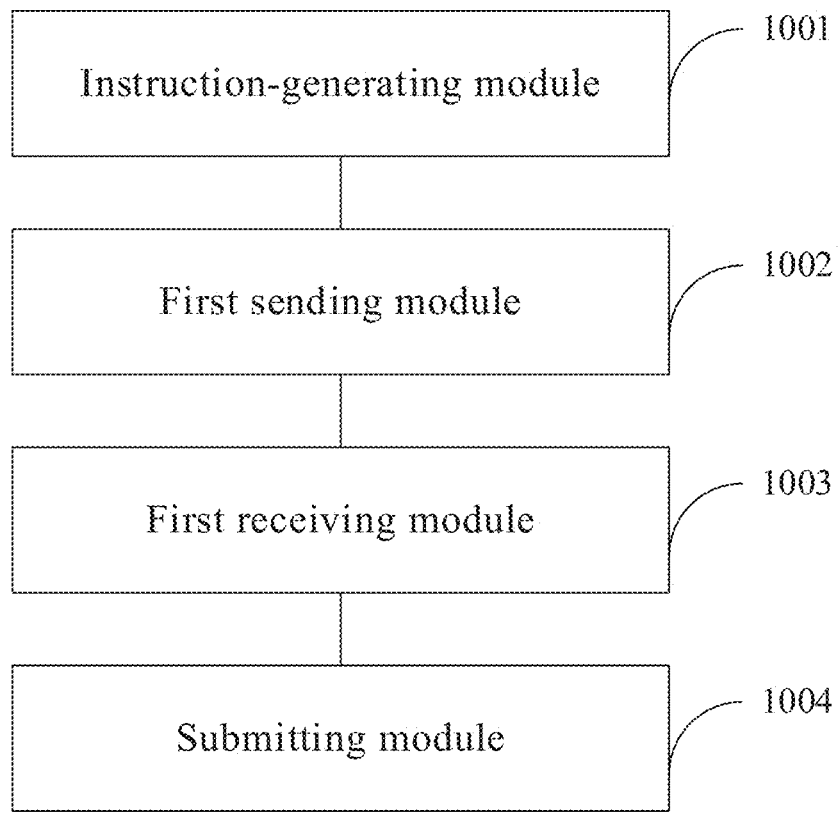
FIG. 10 is a schematic structural diagram of a system of a cloud input method provided by an embodiment of the present disclosure.

FIG. 10 is a schematic structural diagram of a system of a cloud input method provided by an embodiment of the present disclosure.

As shown in FIG. 10, the system provided by the present embodiment includes:

an instruction-generating module 1001, configured to generate an input method startup instruction according to received indication information, where the indication information is generated when a focus of an information input box is acquired;

a first sending module 1002, configured to send the input method startup instruction, where the input method startup instruction is used to startup a local input method;

a first receiving module 1003, configured to receive text content, where the text content is content input by using the local input method;

a submitting module 1004, configured to submit the text content to the information input box for display.

The system provided by the present embodiment can be used to perform the technical solution of the above method embodiments, and the implementation principle and the technical effect are similar, which will not be repeated here in the present embodiment.

Figure 11:
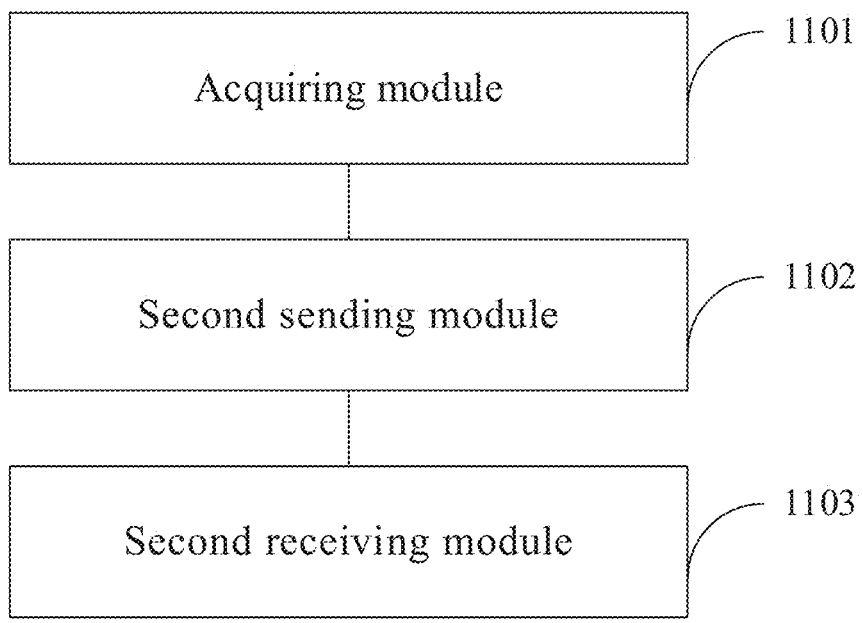
FIG. 11 is a schematic structural diagram of a client provided by an embodiment of the present disclosure.

FIG. 11 is a schematic structural diagram of a client provided by an embodiment of the present disclosure.

As shown in FIG. 11, the client provided by the present embodiment includes:

an acquiring module 1101, configured to generate indication information according to an acquired focus of an information input box;

a second sending module 1102, configured to send the indication information, where the indication information is used to generate an input method startup instruction;

a second receiving module 1103, configured to receive the input method startup instruction, and start up a local input method according to the input method startup instruction;

the acquiring module 1101 is further configured to acquire text content, where the text content is input through the local input method;

the second sending module 1102 is further configured to send the text content, where the text content is used to be submitted to the information input box for display.

The client provided by the present embodiment can be used to perform the technical solution of the above method embodiments, and the implementation principle and the technical effect are similar, which will not be repeated here in the present embodiment.

Figure 12:
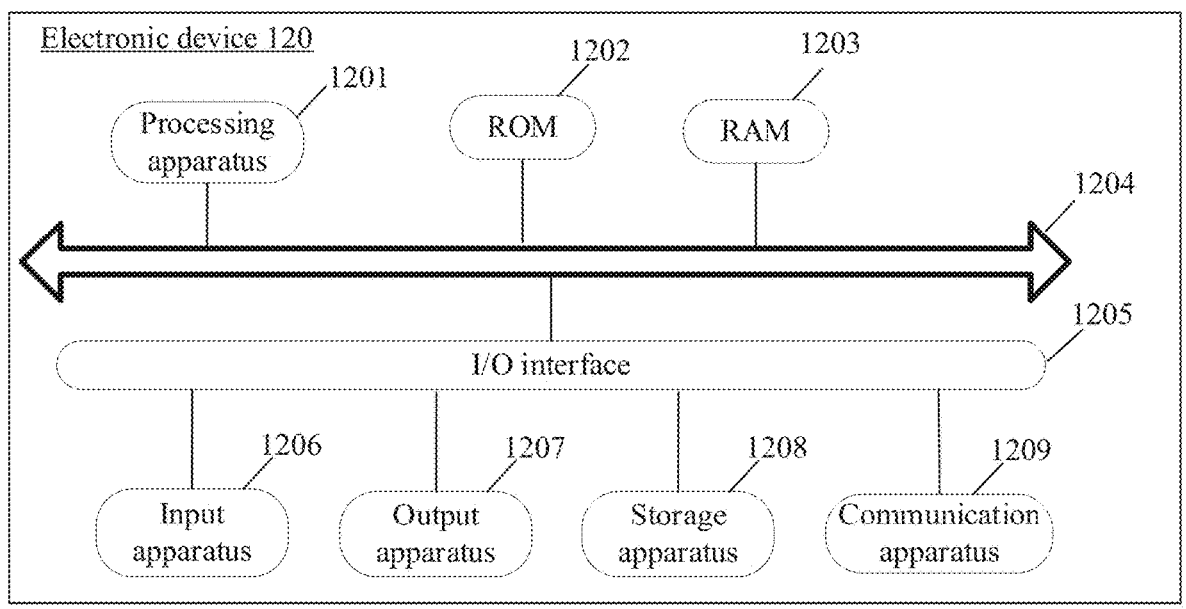
FIG. 12 is a schematic hardware structural diagram of an electronic device provided by an embodiment of the present disclosure.

As shown in FIG. 12, it shows a structural schematic diagram of an electronic device 120 used to implement embodiments of the present disclosure, and the electronic device 120 may be a terminal device or a server. The terminal may include, but is not limited to, mobile terminals such as a mobile phone, a notebook computer, a digital broadcast receiver, a personal digital assistant (PDA), a portable android device (PAD), a portable media player (PMP), a vehicle-mounted terminal (e.g., vehicle navigation terminals), and fixed terminals such as a digital TV and a desktop computer. The electronic device shown in FIG. 12 is only an example, and should not bring any limitation to the functions and application scope of the embodiments of the present disclosure.

As shown in FIG. 12, the electronic device 120 may include a processing apparatus 1201 (such as a central processing unit, a graphics processing unit, etc.), which may perform various appropriate actions and processes according to a program stored in a read only memory 1202 (ROM) or a program loaded into a random access memory 1203

(RAM) from a storage apparatus 1208. In the RAM 1203, various programs and data required for the operation of the electronic device 120 are also stored. The processing apparatus 1201, ROM 1202, and RAM 1203 are connected to each other through a bus 1204. An input/output (I/O) interface 1205 is also connected to the bus 1204.

Generally, the following apparatuses can be connected to the I/O interface 1205: an input apparatus 1206 including, for example, a touch screen, a touch panel, a keyboard, a mouse, a camera, a microphone, an accelerometer, a gyroscope, etc.; an output apparatus 1207 including, for example, a liquid crystal display (LCD), a speaker, a vibrator, etc.; a storage apparatus 1208 including a magnetic tape, a hard disk, etc.; and a communication apparatus 1209. The communication apparatus 1209 may allow the electronic device 120 to perform wireless or wired communication with other devices to exchange data. Although FIG. 12 shows the electronic device 120 with various apparatuses, it should be understood that it is not required to implement or have all the apparatuses shown. More or fewer apparatuses may be implemented or provided instead.

Particularly, according to the embodiments of the present disclosure, the process described above with reference to the flowcharts may be implemented as a computer software program. For example, embodiments of the present disclosure include a computer program product, which includes a computer program carried on a computer-readable medium, and the computer program contains program codes for performing the method shown in the flowcharts. In such embodiment, the computer program can be downloaded and installed from the network through the communication apparatus 1209, or installed from the storage apparatus 1208 or the ROM 1202. When the computer program is executed by the processing apparatus 1201, it performs the above functions defined in the method of the embodiment of the present disclosure.

The embodiments of the present disclosure further provide a computer program product, including a computer program carried on a computer-readable storage medium, and when the computer program is executed by a processor, the information input method provided by any one of the above embodiments is performed.

The embodiments of the present disclosure further provide a computer program, and when the computer program is executed by a processor, the information input method provided by any one of the above embodiments is performed.

It should be noted that the above-mentioned computer-readable medium of the present disclosure may be a computer-readable signal medium or a computer-readable storage medium or any combination of the above two. The computer-readable storage medium may be, for example, but not limited to, an electronic, magnetic, optical, electromagnetic, infrared, or semiconductor system, apparatus or component, or any combination of the above. More specific examples of the computer-readable storage medium may include, but are not limited to, an electrical connection with one or more wires, a portable computer disk, a hard disk, a random access memory (RAM), a read only memory (ROM), an erasable programmable read only memory (EPROM or a flash memory), an optical fiber, a compact disc read-only memory (CD-ROM), an optical storage component, a magnetic storage component, or any suitable combination of the above. In the present disclosure, the computer-readable storage medium may be any tangible medium that contains or stores a program that may be used by or in connection with an instruction execution system, apparatus or device. In the present disclosure, computer-readable signal medium may include data signals propagated in a baseband or as part of a carrier wave, in which computer-readable program codes are carried. This propagated data signal may take various forms, including but not limited to electromagnetic signal, optical signal or any suitable combination of the above. The computer-readable signal medium may also be any computer-readable medium other than the computer-readable storage medium, and the computer-readable signal medium may send, propagate or transmit a program for use by or in connection with the instruction execution system, apparatus or device. The program code contained on the computer-readable medium can be transmitted by any suitable medium, including but not limited to: electric wire, optical cable, RF (Radio Frequency), etc., or any suitable combination of the above.

The computer-readable medium may be included in the electronic device; or it may exist separately without being assembled into the electronic device.

The computer-readable medium carries one or more programs which, when executed by the electronic device, cause the electronic device to perform the method shown in the above embodiments.

Computer program codes for performing the operations of the present disclosure may be written in one or more programming languages or their combinations, including object-oriented programming languages such as Java, Smalltalk, C++, and conventional procedural programming languages such as "C" language or similar programming languages. The program may be executed completely on the user's computer, partially on the user's computer, as an independent software package, partially on the user's computer, partially on a remote computer, or completely on a remote computer or a server. In the case of a remote computer, the remote computer may be connected to a user computer through any kind of networks, including a local area network (LAN) or a wide area network (WAN), or may be connected to an external computer (for example, using an Internet service provider to connect through the Internet).

The flowchart and block diagrams in the accompanied drawings illustrate the system architecture, functions and operations of possible implementations of systems, methods and computer program products according to various embodiments of the present disclosure. In this regard, each block in the flowchart or block diagram may represent a module, a program segment, or a part of a code, and the module, the program segment, or the part of the code contain one or more executable instructions for implementing the specified logical functions. It should also be noted that in some alternative implementations, the functions marked in the blocks may also occur in a different order than those marked in the drawings. For example, two consecutive blocks may actually be executed basically in parallel, and sometimes they may be executed in reverse order, depending on the functions involved. It should also be noted that each block in the block diagram and/or flowchart, and the combination of blocks in the block diagram and/or flowchart, may be implemented by a dedicated hardware-based system that performs specified functions or operations, or may be implemented by a combination of dedicated hardware and computer instructions.

The modules involved in the embodiments described in the present disclosure may be implemented by software or hardware. The name of the modules do not constitute a limitation on the modules per se in some cases. For example, the instruction-generating module may also be described as "a module for generating an instruction".

The functions described above may be at least partially performed by one or more hardware logic components. For example, without limitation, exemplary types of hardware logic components that can be used include: a field programmable gate (FPGA), an application specific integrated circuit (ASIC), an application specific standard product (ASSP), a system on chip (SOC), a complex programmable logic device (CPLD), etc.

In the context of the present disclosure, a machine-readable medium may be a tangible medium that may contain or store a program for use by or in connection with an instruction execution system, apparatus or device. The machine-readable medium may be a machine-readable signal medium or a machine-readable storage medium. The machine-readable medium may be, for example, but not limited to, an electronic, magnetic, optical, electromagnetic, infrared, or semiconductor system, apparatus or device, or any suitable combination of the above. More specific examples of the machine-readable storage medium include an electrical connection based on one or more wires, a portable computer disk, a hard disk, a random access memory (RAM), a read-only memory (ROM), an erasable programmable read-only memory (EPROM or flash memory), an optical fiber, a compact disk read-only memory (CD-ROM), an optical storage device, a magnetic storage device, or any suitable combination of the above.

In a first aspect, according to one or more embodiments of the present disclosure, an information input method is provided, including:

generating an input method startup instruction according to received indication information sent by a client, where the indication information is generated when a focus of an information input box is acquired by the client;

sending the input method startup instruction to the client, where the input method startup instruction is used to indicate the client to start up the local input method;

receiving text content sent by the client, where the text content is content input by the user by using the local input method and received by the client;

submitting the text content to the information input box for display.

According to one or more embodiments of the present disclosure, the input method startup instruction includes text to be displayed in a current information input box, an input method type and an operation identifier corresponding to at least one functional operation;

where the input method type and the operation identifier are used to indicate the client to start up a corresponding input method and to display an input method interface, where the input method interface includes a candidate up-screen area, an information input control corresponding to the input method type, and a functional operation control corresponding to the operation identifier.

According to one or more embodiments of the present disclosure, the method further includes:

receiving a target operation identifier corresponding to a target functional operation control which is operated by a user and sent by the client;

executing the functional operation corresponding to the target operation identifier.

According to one or more embodiments, the target operation identifier is an exit operation identifier corresponding to an exit functional operation control, and the executing the functional operation corresponding to the target operation identifier includes:

generating an input method removing instruction according to the exit operation identifier;

sending the input method removing instruction to the client, where the input method removing instruction is used to indicate the client to remove the input method interface.

According to one or more embodiments of the present disclosure, the submitting the text content to the information input box for display includes:

replacing the text to be displayed in the information input box with the text content.

In a second aspect, according to one or more embodiments of the present disclosure, an information input method is provided, including:

generating indication information according to an acquired focus of an information input box;

sending the indication information to a system of a cloud input method, to cause the system of the cloud input method to generate an input method startup instruction according to the indication information;

receiving the input method startup instruction sent by the system of the cloud input method, and starting up a local input method according to the input method startup instruction;

acquiring text content input by the user by using the local input method;

sending the text content to the system of the cloud input method, to cause the system of the cloud input method to submit the text content to the information input box for display.

According to one or more embodiments of the present disclosure, the input method startup instruction includes text to be displayed in a current information input box, an input method type and an operation identifier corresponding to at least one functional operation, the starting up a local input method according to the input method startup instruction includes:

starting up a corresponding input method and displaying an input method interface according to the input method type and the operation identifier, where the input method interface includes a candidate up-screen area, an information input control corresponding to the input method type, and a functional operation control corresponding to the operation identifier;

submitting the text to be displayed to the candidate up-screen area for display.

According to one or more embodiments of the present disclosure, the method further includes:

sending a target operation identifier corresponding to a target functional operation control operated by the user to the system of the cloud input method, where the target operation identifier is used to indicate the system of the cloud input method to execute the functional operation corresponding to the target operation identifier.

In one or more embodiments of the present disclosure, the target operation identifier is an exit operation identifier corresponding to an exit functional operation control, where the exit operation identifier is used to indicate the system of the cloud input method to generate an input method removing instruction according to the exit operation identifier, the method further includes:

receiving the input method removing instruction sent by the system of the cloud input method;

removing the input method interface according to the input method removing instruction.

In a third aspect, according to one or more embodiments of the present disclosure, a system of a cloud input method is provided, including:

an instruction-generating module, configured to generate an input method startup instruction according to received indication information sent by a client, where the indication information is generated when a focus of an information input box is acquired by the client;

a first sending module, configured to send the input method startup instruction to the client, where the input method startup instruction is used to indicate the client to start up the local input method;

a first receiving module, configured to receive text content sent by the client, where the text content is content input by the user by using the local input method and received by the client;

a submitting module, configured to submit the text content to the information input box for display.

According to one or more embodiments of the present disclosure, the input method startup instruction includes text to be displayed in a current information input box, an input method type and an operation identifier corresponding to at least one functional operation;

where the input method type and the operation identifier are used to indicate the client to start up a corresponding input method and to display an input method interface, where the input method interface includes a candidate up-screen area, an information input control corresponding to the input method type, and a functional operation control corresponding to the operation identifier.

According to one or more embodiments of the present disclosure, the first receiving module is further configured to:

receive a target operation identifier corresponding to a target functional operation control which is operated by a user and sent by the client;

the system further includes: an executing module, configured to execute the functional operation corresponding to the target operation identifier.

According to one or more embodiments of the present disclosure, the functional operation includes any one or more of the following:

sending, searching, going to the next step, going to the last step, completing and exiting.

According to one or more embodiments of the present disclosure, the target operation identifier is an exit operation identifier corresponding to an exit functional operation control, and the executing module is specifically configured to:

generate an input method removing instruction according to the exit operation identifier;

send the input method removing instruction to the client, where the input method removing instruction is used to indicate the client to remove the input method interface.

According to one or more embodiments of the present disclosure, the submitting module is specifically configured to:

replace the text to be displayed in the information input box with the text content.

In a fourth aspect, according to one or more embodiments of the present disclosure, a client is provided, including:

an acquiring module, configured to generate indication information according to an acquired focus of an information input box;

a second sending module, configured to send the indication information to a system of a cloud input method, to cause the system of the cloud input method to generate an input method startup instruction according to the indication information;

a second receiving module, configured to receive the input method startup instruction sent by the system of the cloud input method, and start up a local input method according to the input method startup instruction;

the acquiring module is further configured to acquire text content input by the user by using the local input method;

the second sending module is further configured to: send the text content to the system of the cloud input method, to cause the system of the cloud input method to submit the text content to the information input box for display.

According to one or more embodiments of the present disclosure, the input method startup instruction includes text to be displayed in a current information input box, an input method type and an operation identifier corresponding to at least one functional operation; the second receiving module is specifically configured to:

start up a corresponding input method and displaying an input method interface according to the input method type and the operation identifier, where the input method interface includes a candidate up-screen area, an information input control corresponding to the input method type, and a functional operation control corresponding to the operation identifier;

submit the text to be displayed to the candidate up-screen area for display.

According to one or more embodiments of the present disclosure, the second sending module is further configured to:

send a target operation identifier corresponding to a target functional operation control operated by the user to the system of the cloud input method, where the target operation identifier is used to indicate the system of the cloud input method to execute the functional operation corresponding to the target operation identifier.

According to one or more embodiments of the present disclosure, the functional operation includes any one or more of the following:

sending, searching, going to the next step, going to the last step, completing and exiting.

According to one or more embodiments of the present disclosure, the target operation identifier is an exit operation identifier corresponding to an exit functional operation control, where the exit operation identifier is used to indicate the system of the cloud input method to generate an input method removing instruction according to the exit operation identifier, the second receiving module is further configured to:

receive the input method removing instruction sent by the system of the cloud input method;

remove the input method interface according to the input method removing instruction.

The above description is only preferred embodiments of the present disclosure and the description of the applied technical principle. It should be understood by those of ordinary skills in the art, the disclosure scope involved in the present disclosure is not limited to the technical solution formed by the specific combination of the above technical features, but also covers other technical solutions formed by any combination of the above technical features or their equivalent features without departing from the above disclosed concept. For example, technical solutions formed by replacing the above features with (but not limited to) technical features with similar functions disclosed in the present disclosure.

In addition, although various operations are described in a specific order, this should not be understood as requiring these operations to be performed in the specific order shown or in a sequential order. Under certain circumstances, multitasking and parallel processing may be beneficial. Similarly, although several specific implementation details are included in the above discussion, these should not be interpreted as limiting the scope of the present disclosure. Some features described in the context of separate embodiments may also be implemented in a single embodiment in combination. On the contrary, various features described in the context of one single embodiment may also be implemented in multiple embodiments independently or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are only example forms of implementing the claims.

What is claimed is:

1. An information input method, comprising:
   generating, by a system of a cloud input method, an input method startup instruction according to received indication information, wherein the indication information is generated when a focus of an information input box is acquired, and the indication information indicates a type of information to be input, the type of information being text and numbers, wherein the input method startup instruction comprises text to be displayed in a current information input box, an input method type and an operation identifier corresponding to at least one functional operation, wherein the input method type and the operation identifier are used to indicate starting up of a corresponding input method and display of an input method interface, and wherein the input method interface comprises a candidate up-screen area, an information input control corresponding to the input method type, and a functional operation control corresponding to the operation identifier;
   sending, by the system of the cloud input method, the input method startup instruction, wherein the input method startup instruction is used to startup a local input method;
   receiving, by the system of the cloud input method, text content, wherein the text content is content input by using the local input method; and
   submitting, by the system of the cloud input method, the text content to the information input box for display, wherein the submitting the text content to the information input box for display comprises replacing the text to be displayed in the information input box with the text content.

2. The method according to claim 1, further comprising:
   receiving a target operation identifier corresponding to a target functional operation control;
   executing the functional operation corresponding to the target operation identifier.

3. The method according to claim 2, wherein the target operation identifier is an exit operation identifier corresponding to an exit functional operation control, and the executing the functional operation corresponding to the target operation identifier comprises:
   generating an input method removing instruction according to the exit operation identifier;
   sending the input method removing instruction, wherein the input method removing instruction is used to remove the input method interface.

4. The method according to claim 1, wherein the text content is acquired by modifying a text to be displayed in the candidate up-screen area through using the local input method.

5. A non-transitory computer-readable storage medium, wherein the computer-readable storage medium stores a computer-executable instruction, and when a processor executes the computer-executable instruction, the information input method according to claim 1 is implemented.

6. An information input method, comprising:
   generating indication information according to an acquired focus of an information input box, wherein the indication information indicates a type of information to be input, the type of information being text and numbers;
   sending the indication information, wherein the indication information is used to generate an input method startup instruction by a system of a cloud input method, wherein the input method startup instruction comprises text to be displayed in a current information input box, an input method type and an operation identifier corresponding to at least one functional operation;
   receiving the input method startup instruction generated by the system of the cloud input method, and starting up a local input method according to the input method startup instruction, wherein the starting up the local input method according to the input method startup instruction comprises:
      starting up a corresponding input method and displaying an input method interface according to the input method type and the operation identifier, wherein the input method interface comprises a candidate up-screen area, an information input control corresponding to the input method type, and a functional operation control corresponding to the operation identifier; and
      submitting the text to be displayed to the candidate up-screen area for display;
   acquiring text content, wherein the text content is input through the local input method; and
   sending the text content to the system of the cloud input method, wherein the text content is used to be submitted to the information input box for display, and wherein submitting the text content to the information input box for display comprises replacing the text to be displayed in the information input box with the text content.

7. The method according to claim 6, further comprising:
   sending a target operation identifier corresponding to a target functional operation control, wherein the target operation identifier is used to indicate execution of the functional operation corresponding to the target operation identifier.

8. The method according to claim 7, further comprising:
   sending a target operation identifier corresponding to a target functional operation control, wherein the target operation identifier is used to indicate execution of the functional operation corresponding to the target operation identifier.

9. The method according to claim 7, wherein the target operation identifier is an exit operation identifier corresponding to an exit functional operation control, and the exit operation identifier is used to indicate generation of an input method removing instruction, the method further comprises:
receiving the input method removing instruction;
removing the input method interface according to the input method removing instruction.

10. The method according to claim 8, wherein the target operation identifier is an exit operation identifier corresponding to an exit functional operation control, and the exit operation identifier is used to indicate generation of an input method removing instruction, the method further comprises:
the input method removing instruction;
removing the input method interface according to the input method removing instruction.

11. A system of a cloud input method, comprising:
at least one processor, an interface, and a memory, wherein
the memory stores a computer-executable instruction, and
the at least one processor executes the computer-executable instruction stored in the memory, to cause the at least one processor to:
generate, by the system of the cloud input method, an input method startup instruction according to received indication information, wherein the indication information is generated when a focus of an information input box is acquired, and the indication information indicates a type of information to be input, the type of information being text and numbers, wherein the input method startup instruction comprises text to be displayed in a current information input box, an input method type and an operation identifier corresponding to at least one functional operation, wherein the input method type and the operation identifier are used to indicate starting up of a corresponding input method and display of an input method interface, and wherein the input method interface comprises a candidate up-screen area, an information input control corresponding to the input method type, and a functional operation control corresponding to the operation identifier;
control the interface to send, by the system of the cloud input method, the input method startup instruction, wherein the input method startup instruction is used to startup a local input method;
control the interface to receive, by the system of the cloud input method, text content, wherein the text content is content input by using the local input method; and
submit, by the system of the cloud input method, the text content to the information input box for display, wherein submitting the text content to the information input box for display comprises replacing the text to be displayed in the information input box with the text content.

12. The system according to claim 11, wherein the processor is further configured to:
control the interface to receive a target operation identifier corresponding to a target functional operation control;
execute the functional operation corresponding to the target operation identifier.

13. The system according to claim 12, wherein the target operation identifier is an exit operation identifier corresponding to an exit functional operation control, and the processor is further configured to:
generate an input method removing instruction according to the exit operation identifier;
control the interface to send the input method removing instruction, wherein the input method removing instruction is used to remove the input method interface.

14. A client, wherein the client comprises:
at least one processor, an interface, and a memory;
the memory stores a computer-executable instruction;
the at least one processor executes the computer-executable instruction stored in the memory, to cause the at least one processor to perform the information input method according to claim 6.

15. A non-transitory computer-readable storage medium, wherein the computer-readable storage medium stores a computer-executable instruction, and when a processor executes the computer-executable instruction, the information input method according to claim 6 is implemented.

16. The method according to claim 6, wherein the acquiring text content comprises modifying the text to be displayed in the candidate up-screen area through using the local input method.

* * * * *